(12) United States Patent
Luo et al.

(10) Patent No.: US 11,582,830 B2
(45) Date of Patent: Feb. 14, 2023

(54) METHODS AND APPARATUS FOR PERFORMING LINK SWITCHING

(71) Applicant: ZTE Corporation, Shenzhen (CN)

(72) Inventors: Wei Luo, Shenzhen (CN); Lin Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 11 days.

(21) Appl. No.: 17/267,143

(22) PCT Filed: Aug. 9, 2019

(86) PCT No.: PCT/CN2019/099976
§ 371 (c)(1),
(2) Date: Feb. 9, 2021

(87) PCT Pub. No.: WO2020/030109
PCT Pub. Date: Feb. 13, 2020

(65) Prior Publication Data
US 2021/0315043 A1    Oct. 7, 2021

(30) Foreign Application Priority Data

Aug. 9, 2018  (CN) .......................... 201810903722.6

(51) Int. Cl.
*H04W 76/27*    (2018.01)
*H04W 76/12*    (2018.01)
*H04W 76/19*    (2018.01)
*H04W 76/11*    (2018.01)
*H04W 72/04*    (2023.01)
(Continued)

(52) U.S. Cl.
CPC ....... *H04W 76/27* (2018.02); *H04W 72/0426* (2013.01); *H04W 72/0446* (2013.01); *H04W 72/0453* (2013.01); *H04W 76/11* (2018.02); *H04W 76/12* (2018.02); *H04W 76/19* (2018.02); *H04W 88/14* (2013.01)

(58) Field of Classification Search
CPC ..... H04W 76/27; H04W 76/12; H04W 76/19; H04W 76/11; H04W 72/0426; H04W 72/0446; H04W 72/0453; H04W 88/14; H04W 76/10; H04W 12/02; H04W 36/0033; H04W 8/26
See application file for complete search history.

(56) References Cited

U.S. PATENT DOCUMENTS

| 2017/0006499 | A1* | 1/2017 | Hampel | .............. H04L 41/0668 |
| 2020/0336921 | A1* | 10/2020 | Yerramalli | ........... H04B 7/0695 |

(Continued)

FOREIGN PATENT DOCUMENTS

| WO | 2017004253 A1 | 1/2017 |
| WO | 2017004255 A1 | 1/2017 |

OTHER PUBLICATIONS

Flow control considerations for IAB (Jun. 2018) (Year: 2018).*
(Continued)

*Primary Examiner* — Mewale A Ambaye
(74) *Attorney, Agent, or Firm* — Cantor Colburn LLP

(57) ABSTRACT

An information transmission method and apparatus are provided. In the method, an entity part of an IAB donor transmits information to a DU, wherein the information is used for instructing the DU to perform link status switching. A storage medium and an electronic apparatus are also provided.

20 Claims, 5 Drawing Sheets

(51) Int. Cl.
*H04W 72/0446* (2023.01)
*H04W 72/0453* (2023.01)
*H04W 88/14* (2009.01)

(56) References Cited

U.S. PATENT DOCUMENTS

2021/0021330 A1* 1/2021 Khoshnevisan ..... H04B 7/0404
2021/0136604 A1* 5/2021 Zhou ................... H04W 72/042

OTHER PUBLICATIONS

IAB topology adaptation for architecture group 1" Montreal, Canada, Jul. 2-6, 2018 (Year: 2018).*
F1 TS_38_401_V_15_2 (Jul. 2018) (Year: 2018).*
Intel Corporation, "PHY layer enhancement for NR IAB", 3GPP TSG RAN WG1 #93, May 21-May 25, 2018, Busan, South Korea, R1-1806551.
International Search Report for corresponding application PCT/PCT/CN2019/099976 filed Aug. 9, 2019; dated Oct. 28, 2019.
Samsung, "IAB failure recovery as part of route management", 3GPP TSG-RAN WG3-AH 1807, Montreal, Canada, Jul. 2-6, 2018, R3-183865.
Samsung, "Initial access procedure in IAB", 3GPP TSG-RAN WG3 NR AdHoc 1807, Montreal, Canada, Jul. 2-6, 2018, R3-183864.
Written Opinion of the International Searching Authority for corresponding application PCT/PCT/CN2019/099976 filed Aug. 9, 2019; dated Oct. 28, 2019.
3rd Generation Partnership Project, 3GPP Release 15 2 TS 38.401 V15.2.0 (Jun. 2018).
3rd Generation Partnership Project, 3GPP Release TR 38.874 V02.1 (May 2018).
3rd Generation Partnership Project, 3GPP TS 38.473 V15.2.2 (Jul. 2018).
Ericsson, Vodafone, "Solution 3 for establishment of DRB QoS in CU-DU architecture", 3GPP TSG-RAN WG3 Meeting #99bis, Sanya, China, Apr. 16-20, 2018, R3-182209.
European Search Report for corresponding application EP19847537; Report dated Nov. 23, 2021.
Huawei, "Distributed RRC functions for IAB", 3GPP TSG-RAN WG2#102, Montreal, Canada, Jul. 2-6, 2018, R2-1810735.
Huawei, Hisilicon, "IAB node access procedure", 3GPP TSG-RAN WG2 #102, Busan, Korea, May 21-25, 2018, R2-1808684.
Qualcomm Incorporated, "IAB topology adaptation for architecture group 1", 3GPP TSG RAN WG3 Meeting #AH1807, Montreal CA, Jul. 2-6, 2018, R-3183731.
Sequans Communications, "Flow Control Considerations for IAB", 3GPP TSG-RAN WG2#NR AH1807, Montreal Canada, Jul. 2-6, 2018.
Sony, "Route management in IAB", 3GPP TSG RAN WG2 Meeting #102, Busan, Korea, May 21-25, 2018, R2-1807784.

* cited by examiner

METHODS AND APPARATUS FOR PERFORMING LINK SWITCHING

This application claims priority to Chinese Patent Application No. 201810903722.6, filed with the China National Intellectual Property Administration (CNIPA) on 9 Aug. 2018, the disclosure of which is incorporated herein by reference in its entirety.

TECHNICAL FIELD

The present disclosure relates to, but is not limited to, the field of communications, and in particular, to an information transmission method and apparatus, a storage medium, and an electronic apparatus.

BACKGROUND

In order to improve network capacity and coverage while satisfying the requirements for cell deployment flexibility, a relay link supporting wireless backhaul transmission is proposed in the related art to achieve the deployment of a dense network. A node supporting a relay function is referred to as a Relay Node (RN). The RN provides, for User Equipment (UE) accessing the cell of the RN, functions and services similar to those provided by a normal base station (also referred to as evolved Node B, eNB for short). A wireless interface between the RN and the UE is referred to as an access link. The RN accesses an eNB serving the RN via the wireless interface in a manner similar to the manner in which a normal UE access the eNB. The eNB serving the RN is referred to as a donor base station (also referred to as donor eNB, DeNB for short). The wireless interface between the RN and the DeNB is referred to as a "backhaul link".

Future communication technologies support a larger bandwidth and a larger scale multi-antenna or multi-beam transmission, which facilitates the implementation of a relay that shares air interface resources between the backhaul link and the access link, such implementation being referred to as Integrated Access Backhaul (IAB). In order to further improve the deployment flexibility, an ordinary IAB (also referred to as IAB node) does not need to be directly connected to a core network, and only a donor IAB (also referred to as IAB donor) is directly connected to the core network. Therefore, all ordinary IABs need to transmit data to the donor IAB to achieve the communication with the core network. Referring to FIG. 1, which is a schematic diagram of links related to IAB in the related art of the present disclosure, the IAB node A is connected to a core network via an optical fiber and serves as an IAB donor, while the IAB node B and the IAB node C are not connected to the core network and serve as ordinary IABs.

In order to further improve the flexibility of deployment, referring to FIG. 2, which is a schematic diagram of links when an IAB node serves as a relay in the related art of the present disclosure, an IAB may transmit data to an IAB donor through the relay of a plurality of IABs. In other words, the IABs are hierarchical, and the level of an IAB represents the number of hops of relay IABs which the data from the IAB pass before reaching the IAB donor. Assuming that the level of the donor IAB is 0 and the level of the IAB accessed by the UE is N, then the transmission path between the UE and the core network sequentially passes through the IABs of the levels of 1, 2, . . . N. Assuming that the procedure of connection setup between IABs is similar to the procedure of connection setup between the UE and the eNB, the IAB of the level n+1 is the UE from the perspective of the IAB of the level n, and the IAB of the level n is the serving cell from the perspective of the IAB of the level n+1. If an IAB of the level n+1 is connected to an IAB of the level n via a Uu interface as a UE, then the IAB of the level n is referred to as a parent node of the IAB of the level n+1, and the IAB of the level n+1 is referred to as a child node of the IAB of the level n. Each IAB may choose to access one or more parent nodes. For a network architecture in which Distributed Unit (DU) and Centralized Unit (CU) are split, a CU is only located in an IAB donor, and a non-donor IAB includes only partial functions of a terminal and partial functions of a DU. That is to say, when the IAB accesses an upper-layer IAB as a terminal, a DU of the upper-layer IAB serves as a serving cell of the lower-layer IAB.

There is no effective solution for the problem in the related art that a link interruption delay is long due to a complex link switching flow in the IAB network.

SUMMARY

Embodiments of the present disclosure provide an information transmission method and apparatus, a storage medium, and an electronic apparatus, which may at least solve a problem in the related art that a link interruption delay is long due to a complex link switching flow in an IAB network.

According to an embodiment of the present disclosure, provided is an information transmission method, including the following operation. An entity part of an IAB donor transmits information to a DU, wherein the information is used for instructing the DU to perform link status switching.

According to another embodiment of the present disclosure, provided is an information transmission method, including the following operations. A DU determines link status information about a status of a link between the DU and a terminal, and transmits the link status information to an entity part of an IAB donor.

According to another embodiment of the present disclosure, provided is an information transmission method, including the following operations. A DU receives information transmitted by an entity part of an IAB donor, wherein the information is used for instructing the DU to perform link switching. The DU transmits UE context response information to the entity part of the IAB donor.

According to another embodiment of the present disclosure, provided is an information transmission method, including the following operations. A DU determines that a link between the DU and a terminal is not activated, allocates a resource to the terminal, and receives a control message sent by the terminal.

According to another embodiment of the present disclosure, provided is an information transmission method, including the following operations. An entity part of an IAB donor transmits a UE context request to a DU, and receives a UE context response message sent by the DU. The UE context request includes at least one of the following information: frequency point information, and resource configuration information. The UE context request includes a UE context setup request or a UE context modification request. The UE context response includes a UE context setup response or a UE context modification response.

According to another embodiment of the present disclosure, provided is an information transmission apparatus, including a first transmission module configured to transmit information to a DU. The information is used for instructing the DU to perform link status switching.

According to another embodiment of the present disclosure, provided is an information transmission apparatus, including: a second determination module, configured to determine link status information about a status of a link with a terminal; and a second transmission module, configured to transmit the link status information to an entity part of an IAB donor.

According to another embodiment of the present disclosure, provided is an information transmission apparatus, including: a third receiving module, configured to receive information transmitted by an entity part of an IAB donor, wherein the information is used for instructing a DU to perform link switching; and a third transmission module, configured to transmit UE context response information to the entity part of the IAB donor.

According to another embodiment of the present disclosure, provided is an information transmission apparatus, including: a fourth determination module, configured to determine that a link with a terminal is not activated, and allocate a resource to the terminal; and a fourth receiving module, configured to receive a control message sent by the terminal.

According to another embodiment of the present disclosure, provided is an information transmission apparatus, including: a fifth transmission module, configured to transmit a UE context request to a DU; and a fifth receiving module, configured to receive a UE context response message sent by the DU. The UE context request includes at least one of the following information: frequency point information, and resource configuration information. The UE context request includes a UE context setup request or a UE context modification request. The UE context response includes a UE context setup response or a UE context modification response.

According to yet another embodiment of the present disclosure, a storage medium is further provided. A computer program is stored in the storage medium, and the computer program is configured to execute any one of the foregoing method embodiments at runtime.

According to another embodiment of the present disclosure, provided is an electronic apparatus, including a memory and a processor. The memory stores a computer program, and the processor is configured to run the computer program so as to execute the method of any one of the described methods.

By means of the embodiments of the present disclosure, an entity part of an IAB donor transmits information to a DU, wherein the information is used for instructing the DU to perform link status switching. By means of the solution, the DU timely performs link status switching according to received information, thereby increasing the flexibility of link switching, avoiding a long interruption delay, and solving the problem in the related art that a link interruption delay is long due to the complexity of a link switching flow in an IAB network.

DETAILED DESCRIPTION OF THE EMBODIMENTS

The present disclosure is described below in detail with reference to the drawings and in conjunction with the embodiments. It is to be noted that embodiments in the present application and characteristics in the embodiments may be combined to derive other embodiments not explicitly described.

It is to be noted that the terms "first", "second" and the like in the specification, the claims and the drawings of the present disclosure are used to distinguish similar objects, and are not used to describe a specific sequence or a precedence order.

Embodiment 1

The embodiment of the present disclosure provides a mobile communication network (including an IAB mobile communication network). The network architecture of the network may include an entity part (also referred to as a CU) of an IAB donor, a DU part, and a terminal. The terminal includes a common terminal, and further includes a terminal function part of an IAB entity. Provided in the present embodiment is an information transmission method operable on the described network architecture. It should be noted that the operating environment of the described information transmission method provided in the embodiment of the present disclosure is not limited to the described network architecture.

Figure 1:
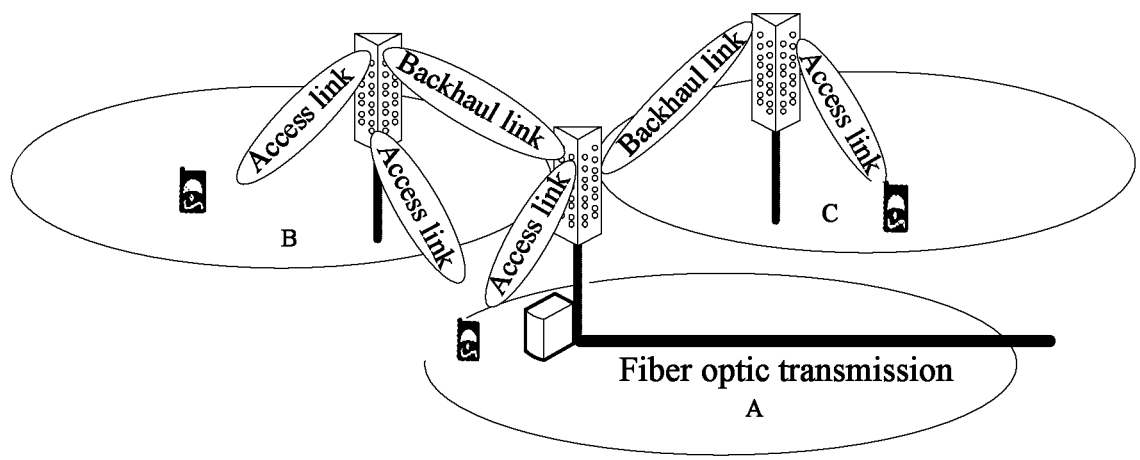
FIG. 1 is a schematic diagram of IAB links in the related art.
Figure 2:
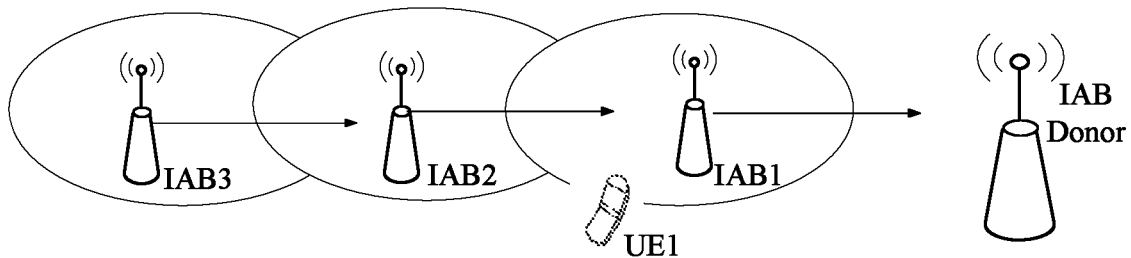
FIG. 2 is a schematic diagram of links when an IAB node serves as a relay in the related art.
Figure 3:
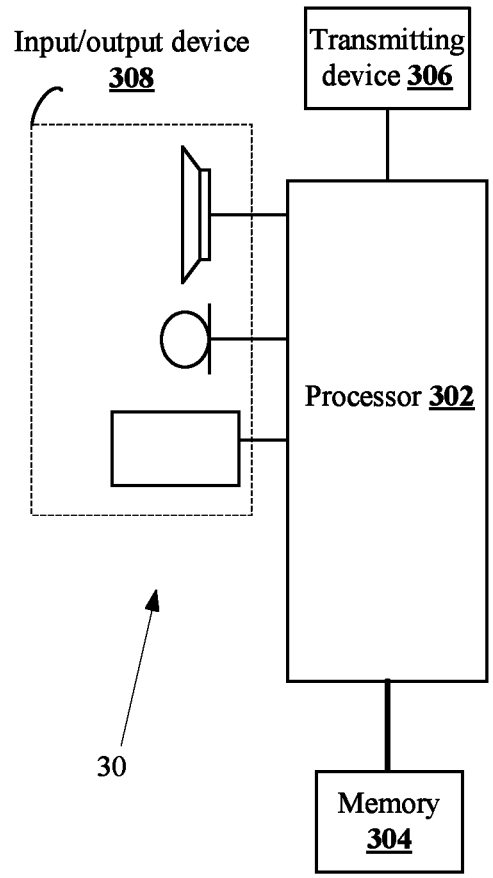
FIG. 3 is a block diagram showing the hardware structure of a mobile terminal of an information transmission method according to an embodiment of the present disclosure.

The method embodiment provided in the first embodiment of the present disclosure may be implemented in a mobile terminal, a computer terminal, or a similar computing apparatus. Taking the operation on a mobile terminal as an example, FIG. 3 is a block diagram showing the hardware structure of a mobile terminal in an information transmission method according to an embodiment of the present disclosure. As shown in FIG. 3, the mobile terminal 30 may include one or more (only one shown in FIG. 3) processors 302 (processor 302 may include a Microcontroller Unit (MCU) or a Field Programmable Gate Array (FPGA)) and a memory 304 for storing data. Optionally, the mobile terminal may further include a transmitting device 306 for communication function and an input/output device 308. A person having ordinary skill in the art can understand that the structure shown in FIG. 3 is merely exemplary, and does not limit the structure of the foregoing mobile terminal. For example, the mobile terminal 30 may further include more or fewer modules than shown in FIG. 3, or have a different configuration from that shown in FIG. 3.

The memory 304 may be configured to store software programs and modules of application software, for example, program instructions/modules corresponding to the information transmission method in the embodiments of the present disclosure. The processor 302 executes various function applications and data processing by running the software programs and modules stored in the memory 304, i.e. implementing the above method. The memory 304 may include high-speed random access memory, and may also include non-volatile memory, such as one or more magnetic storage apparatuses, flash memory, or other non-volatile solid-status memory. In some examples, the memory 304 may further include memory remotely located with respect to the processor 302, and such memory may be connected to the mobile terminal 30 over a network. Examples of such networks include the Internet, intranets, local area networks, mobile communication networks, and combinations thereof.

The transmitting device 306 is configured to receive or transmit data via a network. Specific examples of the network described above may include a wireless network provided by a communication provider of the mobile terminal 30. In one example, the transmitting device 306 may include a Network Interface Controller (NIC) that may be coupled to other network apparatuses via a base station to communicate with the Internet. In one example, the transmitting device 306 may be a Radio Frequency (RF) module configured to communicate wirelessly with the Internet.

Figure 4:
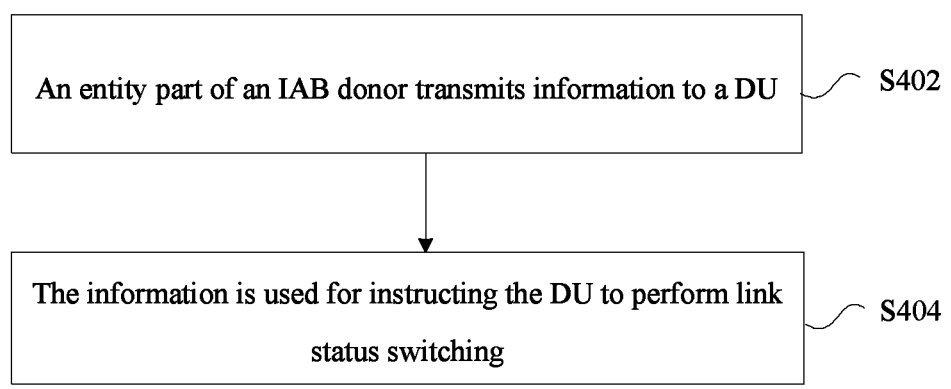
FIG. 4 is a flowchart of a method for transmitting information according to an embodiment of the present disclosure.

Provided is an information transmission method. FIG. 4 is a flowchart of an information transmission method according to an embodiment of the present disclosure. As shown in FIG. 4, the method includes the following operations.

In operation S402, an entity part of an IAB donor transmits information to a DU.

The entity part of the IAB donor includes an IAB donor CU and an IAB donor DU.

The information is used for instructing the DU to perform link status switching.

By means of the described operations, an entity part of an IAB donor transmits information to a DU, wherein the information is used for instructing the DU to perform link status switching. By means of the solution, the DU timely performs link status switching according to received information, thereby increasing the flexibility of link switching, avoiding a long interruption delay, and solving the problem in the related art that a link interruption delay is long due to the complexity of a link switching flow in an IAB network.

In some implementations of the present embodiment, an executor of the foregoing operations may be an IAB donor CU, but is not limited thereto.

In some implementations of the present embodiment, the information is first information including at least one of the following: a cell group identifier requested to be activated; a cell frequency point indication requested to be activated; a path identifier requested to be activated, wherein the path identifier includes a General Packet Radio Service Tunnelling Protocol (GTP) tunnel identifier, a UE F1 Application Protocol (F1AP) identifier, or a gNB-DU identifier; a signaling bearer identifier requested to be activated; a data bearer identifier requested to be activated; a split bearer identifier requested to be activated; a resource configuration information list; and a reconfiguration message (RRCConnectionReconfiguration).

The resource configuration information list includes resource configuration information of a plurality of DU nodes. The resource configuration information includes at least one of the following: a time resource indication, a frequency domain resource indication, a frequency point indication, a beam direction or index indication, and a Bandwidth Part (BWP) indication.

In some implementations of the present embodiment, the RRCConnectionReconfiguration includes at least one of the following: an activated cell group identifier; an activated cell frequency point indication; an activated path identifier, wherein the path identifier includes an uplink GTP tunnel identifier, a UE F1AP identifier, or a gNB-DU identifier; an activated signaling bearer identifier; an activated data bearer identifier; and an activated split bearer identifier.

The resource configuration information list includes resource configuration information of a plurality of DU nodes. The resource configuration information includes at least one of the following: a time resource indication, a frequency domain resource indication, a frequency point indication, a beam direction or index indication, and a BWP indication.

In some implementations of the present embodiment, the information is carried in context modification request information of the terminal, for example, the UE Context Modification Request message.

In some implementations of the present embodiment, the information is second information including at least one of the following: a deactivated cell group identifier; a deactivated cell frequency point indication; a deactivated path identifier, wherein the path identifier includes an uplink GTP tunnel identifier, a UE F1AP identifier or a gNB-DU identifier; a deactivated signaling bearer identifier; a deactivated data bearer identifier; a deactivated split bearer identifier; and an RRCConnectionReconfiguration message.

In some implementations of the present embodiment, the RRCConnectionReconfiguration includes at least one of the following: a deactivated cell group identifier; a deactivated cell frequency point indication; a deactivated path identifier, wherein the path identifier includes an uplink GTP tunnel identifier, a UE F1AP identifier or a gNB-DU identifier; a deactivated signaling bearer identifier; a deactivated data bearer identifier; and a deactivated split bearer identifier.

In some implementations of the present embodiment, the RRCConnectionReconfiguration message is forwarded by the DU to the terminal.

According to another embodiment of the present disclosure, provided is an information transmission method, including the following operations.

In operation 1, a DU determines link status information about a status of a link between the DU and a terminal.

In operation 2, the DU transmits the link status information to an entity part of an IAB donor.

By means of the solution, a DU timely transmits detected link status information to an entity part of an IAB donor, so that the maintenance of a link by the entity part of the IAB donor is facilitated. When a link status fails, information indicating link switching can be timely delivered, thereby avoiding a long interruption delay, and solving the problem in the related art of a long interruption delay caused by a complex link switching flow in an IAB network.

In some implementations of the present embodiment, the operation of transmitting the link status information to the entity part of the IAB donor includes: in a case of determining that the status of the link is link recovery, link recovery indication information is transmitted to the entity part of the IAB donor. The link recovery indication information includes at least one of the following: a link recovery indication, a link measurement status report, a link identifier, a DU identifier, and a current load report.

In some implementations of the present embodiment, the operation of transmitting the link status information to the entity part of the IAB donor includes: in a case of determining that the status of the link is link failure or link blocking, link failure or link blocking information is transmitted to the entity part of the IAB donor. The link failure or link blocking information includes at least one of the following: a link failure indication; a link blocking indication; a channel status report; a link identifier; a DU identifier; a current load report; and a link failure cause indication.

A link failure cause indicated in the link failure cause indication includes one of the following: a poor link status, or a link blocking caused by link congestion.

According to another embodiment of the present disclosure, provided is an information transmission method, including the following operations.

In operation 1, a DU receives information transmitted by an entity part of an IAB donor, wherein the information is used for instructing the DU to perform link switching.

In operation 2, the DU transmits a UE context response message to the entity part of the IAB donor.

By means of the solution, a DU timely performs link status switching according to received information, thereby increasing the flexibility of link switching, avoiding a long interruption delay, and solving the problem in the related art that a link interruption delay is long due to a complex link switching flow in an IAB network.

In some implementations of the present embodiment, the UE context response message includes at least one of the following: an activated signaling bearer identifier; an activated data bearer identifier; an activated split bearer identifier; an activated cell group identifier; an activated cell frequency point indication; an activated path identifier, wherein the path identifier includes an uplink GTP tunnel identifier, a UE F1AP identifier or a gNB-DU identifier.

According to another embodiment of the present disclosure, provided is an information transmission method. The method includes the following operations.

In operation 1, a DU determines that a link between the DU and a terminal is not activated, and allocates a resource to the terminal.

In operation 2, the DU receives a control message sent by the terminal.

By means of the solution, when a link between a DU and a terminal is not activated, the DU allocates a resource to the terminal, and the terminal can use the allocated resource to perform data transmission, thereby avoiding a long interruption delay, and solving the problem in the related art that a link interruption delay is long due to a complex link switching flow in an IAB network.

In some implementations of the present embodiment, the operation of allocating, by the DU, the resource to the terminal includes one of the following: the DU allocates SR information to the terminal, wherein the SR information is used for the terminal to report a link activation request or for the terminal to report a resource request; the DU allocates a Semi-Persistent Scheduling (SPS) resource to the terminal, wherein the SPS resource is used for the terminal to report link failure indication information.

In some implementations of the present embodiment, the link failure indication information includes at least one of the following: an identifier of a DU with a link failure, and channel measurement report information. Alternatively or additionally, the link activation request includes at least one of the following: an identifier of a first end of a link requested to be activated, and an identifier of a second end of the link requested to be activated.

In some implementations of the present embodiment, the operation that the DU receives the control message sent by the terminal includes: the DU receives a link activation request or link failure indication information sent by the terminal. Subsequently, the message may be forwarded to the entity part of the IAB donor through the F1AP.

In some implementations of the present embodiment, after the DU receives the control message sent by the terminal, the DU packs the link failure indication information into an RRC container, and forwards the RRC container to the entity part of the IAB donor through the F1AP.

According to another embodiment of the present disclosure, provided is an information transmission method, including the following operations.

In operation 1, an entity part of an IAB donor transmits a UE context request to a DU.

In operation 2, the entity part of the IAB donor receives a UE context response message sent by the DU. The UE context request includes at least one of the following information: frequency point information, and resource configuration information. The UE context request includes a UE context setup request or a UE context modification request. the UE context response message includes a UE context setup response or a UE context modification response.

By means of the solution, an entity part of an IAB donor and a DU perform information transmission in time to determine UE context information, thereby ensuring the appropriate connection of a link used by a UE, and avoiding a long interruption delay.

Description will be given below with reference to another embodiment of the present disclosure.

When the link communication between the relay node and its serving node is interrupted due to reasons such as poor link status or congestion, the mechanism in the related art can only re-establish the flow through a switching or reestablishment procedure, but the interruption delay caused in this way is very long, and the delay requirement of the ongoing service may not be satisfied.

The solutions in the embodiments of the present disclosure include the following parts.

1. In a connection setup phase, a CU needs to send a UE context setup request message, the message including at least one of the following:

an established but not activated cell group identifier;
an established but not activated path identifier, including an uplink GTP tunnel identifier, a UE F1AP identifier or a gNB-DU identifier;
an established but not activated signaling bearer identifier;
an established but not activated data bearer identifier;
an established split bearer identifier; and
RRCConnectionReconfiguration.

The RRCConnectionReconfiguration message includes at least one of the following: an established but not activated cell group identifier; an established but not activated path identifier, including an uplink GTP tunnel identifier, a UE F1AP identifier or a gNB-DU identifier; an established but not activated signaling bearer identifier; an established but not activated data bearer identifier; and an established split bearer identifier.

2. When the CU determines to activate a certain link, the donor-CU sends a UE Context Modification Request message to the DU2. The UE Context Modification Request message includes a generated RRCConnectionReconfiguration message configured for the UE. The UE Context Modification Request message includes at least one of the following: a signaling bearer identifier requested to be activated; a data bearer identifier requested to be activated; a path identifier requested to be activated, including an uplink GTP tunnel identifier, a UE F1AP identifier or a gNB-DU identifier; a cell group identifier requested to be activated; a cell frequency point indication requested to be activated; a newly established signaling bearer identifier; and a newly established data bearer identifier.

The RRCConnectionReconfiguration message includes at least one of the following: an activated signaling bearer identifier; an activated data bearer identifier; an activated path identifier, including an uplink GTP tunnel identifier, a UE F1AP identifier or a gNB-DU identifier; an activated cell group identifier; an activated cell frequency point indication; a newly established signaling bearer identifier; and a newly established data bearer identifier.

3. When the link status is recovered, the DU sends link recovery indication information to the CU. the link recovery indication information includes: a link recovery indication; a link measurement status report; a link identifier; a DU identifier; and a current load report.

4. When the link fails or is blocked, the DU sends link failure or link blocking information to the CU. The link failure or link blocking information includes a link failure indication; a link blocking indication; a channel status report; a link identifier; a DU identifier; and a current load report.

5. Although the link between the terminal function part of the IAB and the DU2 is not activated, the DU2 has allocated a resource to be used by the IAB for indicating a link failure. The allocation may adopt the following two manners.

Manner 1: a physical layer resource is allocated, and a link activation request is indicated through 1 bit information.

Manner 2: a Semi Persistent Scheduling (SPS) resource is pre-allocated for reporting indication information indicating a link failure (link failure indication information). The link failure indication information at least includes an id of a DU with a link failure, and channel measurement report information.

Therefore, after detecting a link failure, the IAB reports link failure information or link activation request information to the DU2. The DU2 sends a link activation request to the CU through the F1AP, or sends failure indication information to the CU through the F1AP.

The link activation request at least includes an identifier of a first end of a link requested to be activated, and an identifier of a second end of the link requested to be activated, including a UE F1AP identifier or a gNB-DU identifier.

For the Manner 2, the DU2 may pack the received link failure indication information into the RRC container, and send the RRC container to the CU through the F1AP. Subsequently, the CU decides which link to activate.

6. If a plurality of links are activated at the same time or a plurality of links connected to the UE are all working at the same time, the IAB donor needs to perform resource coordination, which includes two manners.

Manner 1: an IAB donor sends frequency point information to a DU serving the UE, so that the UE can simultaneously communicate with a plurality of serving DUs respectively at different frequency points.

Manner 2: The IAB donor sends resource configuration information to the DU, and the DU then forwards the resource configuration information to the UE, so that the UE simultaneously communicates with a plurality of serving DUs respectively on different resource pools.

An IAB entity part of an IAB donor transmits a UE context request to a DU.

The DU sends a UE context response message to the entity part of the IAB donor.

The UE context request includes at least one of the following information:
frequency point information; and
resource configuration information.

The UE context request includes a UE context setup request or a UE context modification request. The UE context response includes a UE context setup response or a UE context modification response.

The following are exemplary embodiments of the present disclosure.

Exemplary Embodiment 1

Figure 5:
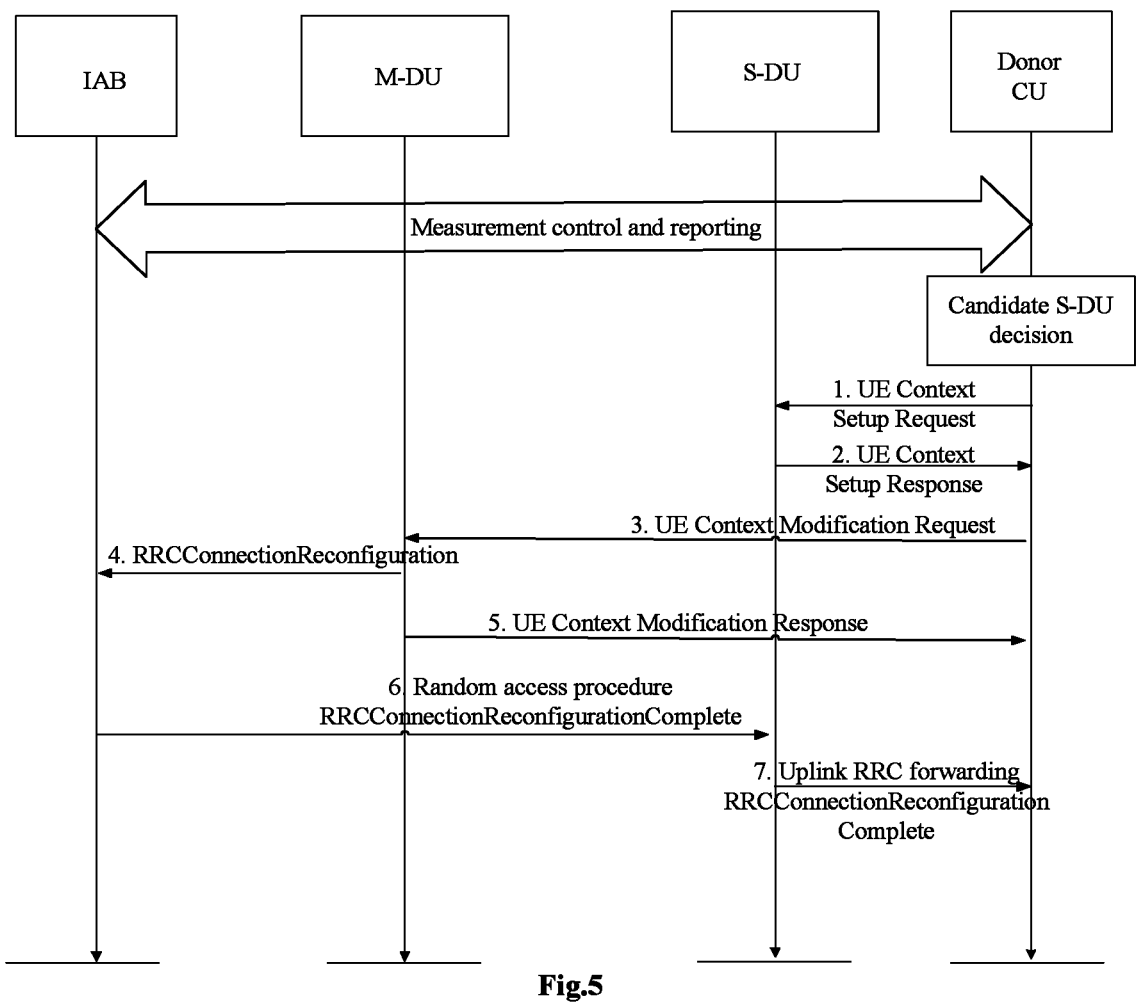
FIG. 5 is a schematic diagram of Exemplary Embodiment 1 of the present disclosure.

FIG. 5 is a schematic diagram of Exemplary Embodiment 1 of the present disclosure. As shown in FIG. 5, in the present embodiment, a UE is connected to an M-DU1, and reports a measurement result to a donor CU. A donor CU selects an auxiliary DU (S-DU) for the UE based on a measurement report.

In operation 1, after selecting an S-DU based on the measurement report, the donor CU sends a UE Context Setup Request message to the S-DU for generating UE context information.

The UE Context Setup Request message includes at least one of the following: an established but not activated cell group identifier; an established but not activated path identifier, including an uplink GTP tunnel identifier or a DU identifier; an established but not activated signaling bearer identifier; an established but not activated data bearer identifier; and an established split bearer identifier.

An RRCConnectionReconfiguration message includes at least one of the following: an established but not activated cell group identifier; an established but not activated path identifier, including an uplink GTP tunnel identifier or a DU identifier; an established but not activated signaling bearer identifier; an established but not activated data bearer identifier; and an established split bearer identifier.

In operation 2, the S-DU sends a UE Context Setup Response message to the donor-CU.

In operation 3, the donor-CU sends a UE Context Modification Request message to an M-DU (master DU). The UE Context Modification Request message includes the RRC-ConnectionReconfiguration message generated for the UE.

The UE Context Modification Request message includes at least one of the following: an established but not activated cell group identifier; an established but not activated path identifier, including an uplink GTP tunnel identifier or a DU identifier or an F1AP identifier; an established but not activated signaling bearer identifier; an established but not activated data bearer identifier;

The RRCConnectionReconfiguration message includes at least one of the following: an established but not activated cell group identifier; an established but not activated path identifier, including an uplink GTP tunnel identifier or a DU identifier; an established but not activated signaling bearer identifier; and an established but not activated data bearer identifier.

In operation 4, the M-DU forwards the received RRC-ConnectionReconfiguration message to the UE.

In operation 5, the M-DU returns a UE Context Modification Response message to gNB-CU.

In operation 6, the target S-DU executes a random access procedure and generates an RRCConnectionReconfigurationComplete message.

In operation 7, the target S-DU sends uplink RRC forwarding information to the donor CU. The uplink RRC forwarding information is used for transmitting the RRC-ConnectionReconfigurationComplete message.

Exemplary Embodiment 2

Figure 6:
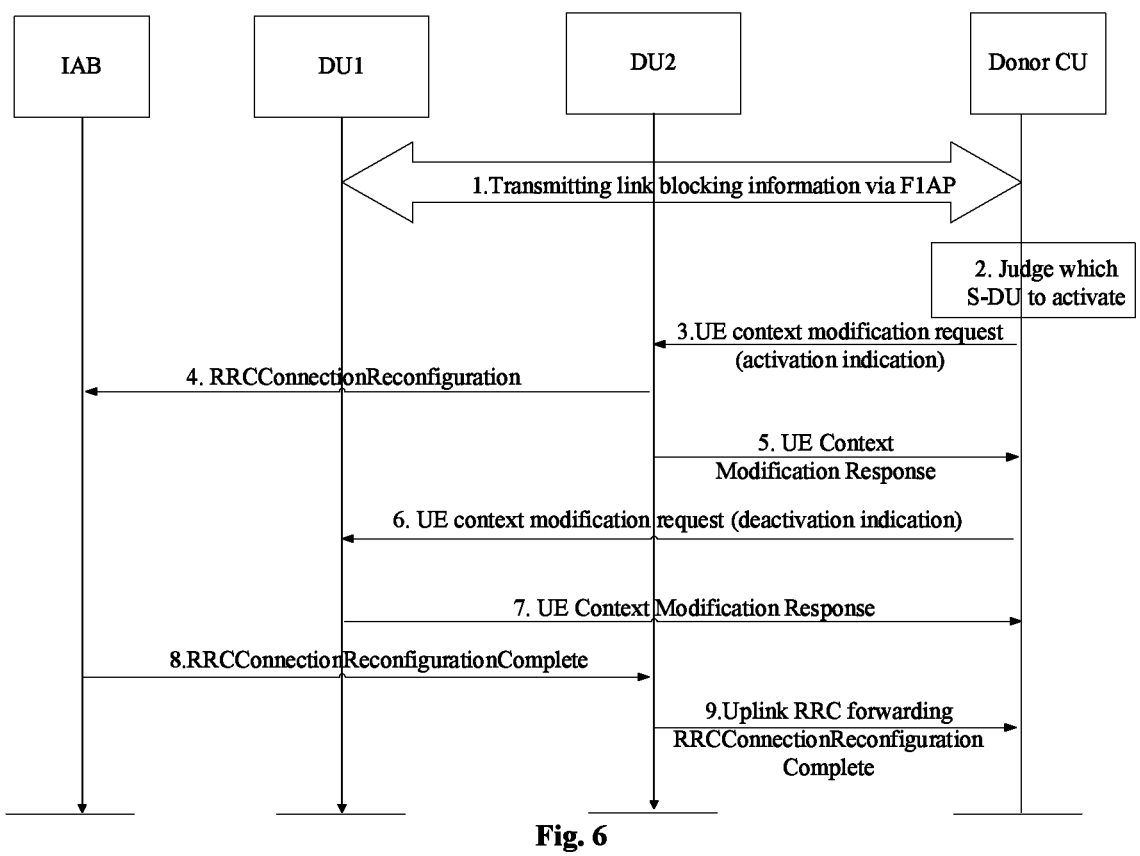
FIG. 6 is a schematic diagram of a link switching flow according to Exemplary Embodiment 2 of the present disclosure.

FIG. 6 is a schematic diagram of a link switching flow according to Exemplary Embodiment 2 of the present disclosure. As shown in FIG. 6, the flow includes the following operations.

In operation 1, a DU1 sends link failure or link blocking information to a CU. The link failure or link blocking information includes a link failure indication; a link blocking indication; a channel status report; a link identifier; a DU identifier; and a current load report.

In operation 2, the CU judges and decides to activate a link between a DU2 and an IAB.

In operation 3, a donor-CU sends a UE context modification request message to the DU2. The UE context modification request message includes an RRCConnectionReconfiguration message generated for the UE.

A UE Context Modification Request message includes at least one of the following: an activated signaling bearer identifier; an activated data bearer identifier; an activated path identifier, including an uplink GTP tunnel identifier or a DU identifier; an activated cell group identifier; a newly established signaling bearer identifier; and a newly established data bearer identifier.

The RRCConnectionReconfiguration message includes at least one of the following: an activated signaling bearer identifier; an activated data bearer identifier; an activated path identifier, including an uplink GTP tunnel identifier or a DU identifier; an activated cell group identifier; a newly established signaling bearer identifier; and a newly established data bearer identifier.

In operation 4, the DU2 sends the RRCConnectionReconfiguration message to the IAB.

In operation 5, the DU2 sends a UE context modification response to the CU.

The operations 6 and 7 below are optional operations.

In operation 6, the donor-CU sends to the DU1 a UE Context Modification Request message including an RRCConnectionReconfiguration message generated for the UE.

The UE Context Modification Request message includes at least one of the following: a deactivated signaling bearer identifier; a deactivated data bearer identifier; a deactivated path identifier, including an uplink GTP tunnel identifier or a DU identifier; a deactivated cell group identifier; a released signaling bearer identifier; and a released data bearer identifier.

The RRCConnectionReconfiguration message includes at least one of the following: a deactivated signaling bearer identifier; a deactivated data bearer identifier; a deactivated path identifier, including an uplink GTP tunnel identifier or a DU identifier; a deactivated cell group identifier; a released signaling bearer identifier; and a released data bearer identifier.

In operation 7, the DU2 sends the UE context modification response to the CU.

In operation 8, the IAB sends a connection reconfiguration completion message to the DU2.

In operation 9, the DU2 forwards the connection reconfiguration completion message to the CU through the F1 interface.

Exemplary Embodiment 3

Figure 7:
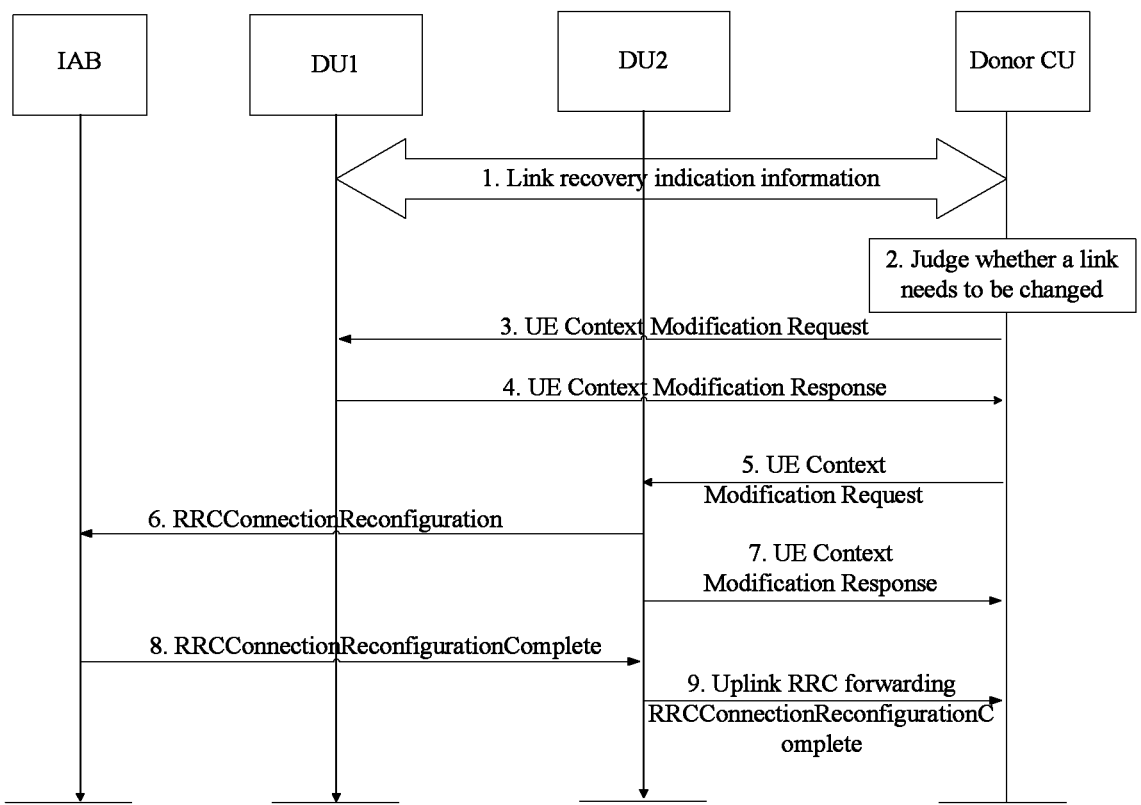
FIG. 7 is a schematic diagram of Exemplary Embodiment 3 of the present disclosure.

FIG. 7 is a schematic diagram of Exemplary Embodiment 3 of the present disclosure. As shown in FIG. 7, the embodiment includes the following operations.

In operation 1, a DU1 sends link recovery indication information to a CU. The link recovery indication information includes: a link recovery indication; a link measurement status report; a link identifier; a DU identifier; and a current load report.

In operation 2, the CU judges and decides to activate the link between the DU1 and an IAB.

In operation 3, the donor-CU sends a UE context modification request message to the DU1. The UE context modification request message includes an RRCConnectionReconfiguration message generated for the UE.

The UE Context Modification Request message includes at least one of the following: an activated signaling bearer identifier; an activated data bearer identifier; an activated path identifier, including an uplink GTP tunnel identifier or a DU identifier; an activated cell group identifier; a newly established signaling bearer identifier; and a newly established data bearer identifier.

The RRCConnectionReconfiguration message includes at least one of the following: an activated signaling bearer identifier; an activated data bearer identifier; an activated path identifier, including an uplink GTP tunnel identifier or a DU identifier; an activated cell group identifier; a newly established signaling bearer identifier; and a newly established data bearer identifier.

In operation 4, the DU2 sends the RRCConnectionReconfiguration message to the IAB.

In operation 5, the DU2 sends a UE context modification response to the CU.

The operations 6 and 7 below are optional operations.

In operation 6, the donor-CU sends a UE context modification request message to the DU1. The UE context modification request message includes an RRCConnectionReconfiguration message generated for the UE.

The UE Context Modification Request message includes at least one of the following: a deactivated signaling bearer identifier; a deactivated data bearer identifier; a deactivated path identifier, including an uplink GTP tunnel identifier or a DU identifier; a deactivated cell group identifier; a released signaling bearer identifier; and a released data bearer identifier.

The RRCConnectionReconfiguration message includes at least one of the following: a deactivated signaling bearer identifier; a deactivated data bearer identifier; a deactivated path identifier, including an uplink GTP tunnel identifier or a DU identifier; a deactivated cell group identifier; a released signaling bearer identifier; and a released data bearer identifier.

In operation 7, DU2 sends a UE context modification response to the CU.

In operation 8, the IAB sends a connection reconfiguration completion message to the DU2.

In operation 9, the DU2 forwards the connection reconfiguration completion message to the CU through the F1 interface.

Exemplary Embodiment 4

This embodiment differs from the Exemplary Embodiment 2 in that the status of the link is detected by an IAB. When the IAB detects a link failure, the link failure is reported to a CU through an inactivated link between the IAB and a DU2.

Although the link between the IAB and the DU2 is not activated yet, the DU2 has allocated resources for the IAB for reporting the link failure indication. This scheme can be achieved in at least the following two manners.

Manner 1: a Scheduling Request (SR) resource is allocated for indicating a link activation request.

Manner 2: an SPS resource is pre-allocated for reporting indication information for indicating a link failure. The indication information at least includes: a DU id identifying the DU with link failure, and channel measurement report information.

Therefore, after detecting a link failure, the IAB reports link failure information or link activation request information to the DU2. The DU2 sends a link activation request to the CU through the F1AP, or sends failure indication information to the CU through the F1AP.

The link activation request at least includes the ids of both ends of the link requested to be activated, including a UE F1AP identifier or a gNB-DU identifier.

For the Manner 2, the DU2 may also pack the received link failure indication information into the RRC container, and send the link failure information to the CU through the F1AP. Subsequently, the CU decides which link to activate.

The donor CU can decide whether to activate the link according to the link failure indication and decide which link should be deactivated. In addition, if the DU requested to be activated cannot serve the IAB currently, an activation failure may be fed back. If the activation fails other available links exist, the donor CU may continue to request for the activation of other links.

Note: after a certain link of the IAB is activated, the other links may be considered to be deactivated by default, or the donor CU may send deactivation information.

Exemplary Embodiment 5

It is assumed that the terminal is connected to two or more DUs, and one or more of the DUs are in an activated status, while some of the other DUs are in a deactivated status. When the entity unit of the donor determines that a link switching is required according to the measurement report reported by the IAB, the following operations are performed.

In operation 1, a terminal reports a measurement report.

In operation 2, an entity unit of a donor determines to reselect or activate a DU for the terminal according to the measurement report, and performs link switching or migration.

In operation 3, the entity unit of the donor sends a UE context modification request to a target DU.

The UE context modification request information includes one of the following: a link migration indication or a link switching indication; an activation request indication; an activated DU identifier; an activated UE F1AP identifier; an activated cell group identifier; configured bearer configuration indication information; a target DU identifier of the migration or switching; a target UE F1AP identifier of migration or switching; or a target cell group identifier of the migration or switching.

Functions implemented by activation, migration or switching in the present disclosure may be the same, although activation, migration and switching are different expressions.

In operation 4, the target activated DU sends a UE context modification response message to the entity unit of the donor.

The UE context modification response message includes one of the following: an activated DU identifier; an activated UE F1AP identifier; a cell group identifier activated successfully; bearer information configured successfully; bearer information configured unsuccessfully; a DU identifier migrated or switched successfully; a UE F1AP identifier migrated or switched successfully; or a target cell group identifier migrated or switched successfully.

In operation 5, the entity unit of the donor sends a context modification request message to a source DU. The context modification request message includes: a link migration indication or a link switching indication; a deactivation instruction; a deactivated DU identifier; a deactivated UE HAP identifier; a deactivated cell group identifier; an activated target DU identifier; an activated UE F1AP identifier; an activated cell group identifier; configured bearer configuration indication information; a target DU identifier of migration or switching; a target UE F1AP identifier of the migration or switching; a target cell group identifier of the migration or switching; an RRCConnectionReconfiguration message.

In operation 6, the source DU sends a UE context modification response message. The UE context modification response message includes: a deactivated DU identifier; a deactivated UE HAP identifier; a deactivated cell group identifier.

In operation 7, the source DU sends an RRC reconfiguration message to an IAB. The RRC reconfiguration message includes: a link migration indication or a link switching indication; a deactivated DU identifier; a deactivated UE F1AP identifier; a deactivated cell group identifier; an activated target DU identifier; an activated UE F1AP identifier; an activated cell group identifier; configured bearer configuration indication information; a target DU identifier of migration or switching; a target UE F1AP identifier of the migration or switching; a target cell group identifier of the migration or switching.

In operation 8, the IAB sends an RRC reconfiguration completion message to the target DU.

In operation 9, the target DU sends the RRC reconfiguration completion message to the entity unit of the donor.

Through the description of the above implementations, those having ordinary skill in the art can understand that the method according to the above embodiment may be implemented by means of software plus a necessary general hardware platform, and of course, may also be implemented through hardware, but in many cases, the former is a better implementation. Based on such understanding, the essence of technical solution of the embodiments of the present disclosure, or in other words, the part of the technical solutions making contributions to the conventional art, may be embodied in the form of a software product stored in a storage medium (such as a Read-Only Memory (ROM)/ Random Access Memory (RAM), a magnetic disk and an optical disc), including a number of instructions for enabling a terminal apparatus (which may be a mobile phone, a computer, a server, or a network apparatus, etc.) to perform the methods described in various embodiments of the present disclosure.

Embodiment 2

The embodiment provides an information transmission apparatus. The apparatus is used to implement the above embodiments and exemplary implementations, and the details having been described will not be repeated. As used below, the term "module" may implement a combination of software and/or hardware of a predetermined function. Although the apparatus described in the following embodiments is preferably implemented in software, the implementation in hardware or a combination of software and hardware is also possible and contemplated.

According to another embodiment of the present disclosure, an information transmission apparatus is provided, including:

a first transmission module, configured to transmit information to a DU, wherein the information is used for instructing the DU to perform link status switching.

By means of the described operations, an entity part of an IAB donor transmits information to a DU, wherein the information is used for instructing the DU to perform link status switching. By means of the solution, the DU timely performs link status switching according to received information, thereby increasing the flexibility of link switching, avoiding a long interruption delay, and solving the problem in the related art that a link interruption delay is long due to the complexity of a link switching flow in an IAB network.

In some implementations of the present embodiment, the information is first information including at least one of the following: a cell group identifier requested to be activated; a cell frequency point indication requested to be activated; a path identifier requested to be activated, wherein the path identifier includes an uplink GTP tunnel identifier, a UE F1AP identifier or a gNB-DU identifier; a signaling bearer identifier requested to be activated; a data bearer identifier requested to be activated; a split bearer identifier requested to be activated; a resource configuration information list; and a reconfiguration message RRCConnectionReconfiguration;

The resource configuration information list includes resource configuration information of a plurality of DU nodes. The resource configuration information includes at least one of the following: a time resource indication, a frequency domain resource indication, a frequency point indication, a beam direction or index indication, and a Bandwidth Part (BWP) indication.

In some implementations of the present embodiment, the RRCConnectionReconfiguration includes at least one of the following: an activated cell group identifier; an activated cell frequency point indication; an activated path identifier, wherein the path identifier includes an uplink GTP tunnel identifier, a UE F1AP identifier or a gNB-DU identifier; an activated signaling bearer identifier; an activated data bearer identifier; and an activated split bearer identifier.

The resource configuration information list includes resource configuration information of a plurality of DU nodes. The resource configuration information includes at least one of the following: a time resource indication, a frequency domain resource indication, a frequency point indication, a beam direction or index indication, and a BWP indication.

In some implementations of the present embodiment, the UE Context Modification Request message carries the above information.

In some implementations of the present embodiment, the information is second information including at least one of the following: a deactivated cell group identifier; a deactivated cell frequency point indication; a deactivated path identifier, wherein the path identifier includes an uplink GTP tunnel identifier, a UE F1AP identifier or a gNB-DU identifier; a deactivated signaling bearer identifier; a deactivated data bearer identifier; a deactivated split bearer identifier; and an RRCConnectionReconfiguration message.

In some implementations of the present embodiment, the RRCConnectionReconfiguration includes at least one of the following: a deactivated cell group identifier; a deactivated cell frequency point indication; a deactivated path identifier, wherein the path identifier includes an uplink GTP tunnel identifier, a UE F1AP identifier or a gNB-DU identifier; a deactivated signaling bearer identifier; a deactivated data bearer identifier; and a deactivated split bearer identifier.

In some implementations of the present embodiment, the RRCConnectionReconfiguration message is forwarded by the DU to the terminal.

According to another embodiment of the present disclosure, an information transmission apparatus is provided, including:

a second determining module, configured to determine link status information about a status of a link between the DU and a terminal; and a second transmission module, configured to transmit the link status information to the entity part of the IAB donor.

By means of the solution, a DU timely transmits detected link status information to an entity part of an IAB donor, so that the maintenance of a link by the entity part of the IAB donor is facilitated. When a link status fails, information indicating link switching can be timely delivered, thereby avoiding a long interruption delay, and solving the problem in the related art of a long interruption delay caused by a complex link switching flow in an IAB network.

In some implementations of the present embodiment, the operation of transmitting the link status information to the entity part of the IAB donor includes: in a case of determining that the status of the link is link recovery, transmitting link recovery indication information to the entity part of the IAB donor, wherein the link recovery indication information includes at least one of the following: a link recovery indication, a link measurement status report, a link identifier, a DU identifier, and a current load report.

In some implementations of the present embodiment, the operation of transmitting the link status information to the entity part of the IAB donor includes: in a case of determining that the status of the link is link failure or link blocking, transmitting link failure or link blocking information to the entity part of the IAB donor, wherein the link failure or link blocking information includes at least one of the following: a link failure indication; a link blocking indication; a channel status report; a link identifier; a DU identifier; a current load report; and a link failure cause indication.

A link failure cause indicated in the link failure cause indication includes one of the following: a poor link status, or a link blocking caused by link congestion.

According to another embodiment of the present disclosure, an information transmission apparatus is provided, including:

a third receiving module configured to receive information transmitted by an entity part of an IAB donor, wherein the information is used for instructing the DU to perform link switching; and a third transmission module, configured to transmit a UE context response message to the entity part of the IAB donor.

By means of the solution, a DU timely performs link status switching according to received information, thereby increasing the flexibility of link switching, avoiding a long interruption delay, and solving the problem in the related art that a link interruption delay is long due to a complex link switching flow in an IAB network.

In some implementations of the present embodiment, the UE context response message includes at least one of the following: an activated signaling bearer identifier; an activated data bearer identifier; an activated split bearer identifier; an activated cell group identifier; an activated cell frequency point indication; an activated path identifier, wherein the path identifier includes an uplink GTP tunnel identifier, a UE F1AP identifier or a gNB-DU identifier.

According to another embodiment of the present disclosure, an information transmission apparatus is provided, including:

a fourth determining module, configured to determine that a link with a terminal is not activated, and allocate a resource to the terminal; and a fourth receiving module, configured to receive a control message sent by the terminal.

By means of the solution, when a link between a DU and a terminal is not activated, the DU allocates a resource to the terminal, and the terminal can use the allocated resource to perform data transmission, thereby avoiding a long interruption delay, and solving the problem in the related art that a link interruption delay is long due to a complex link switching flow in an IAB network.

In some implementations of the present embodiment, the operation of allocating, by the DU, the resource to the terminal includes one of the following: allocating, by the DU, SR information to the terminal, wherein the SR information is used for the terminal to report a link activation request or for the terminal to report a resource request; allocating a Semi-Persistent Scheduling (SPS) resource to the terminal, wherein the SPS resource is used for the terminal to report link failure indication information.

In some implementations of the present embodiment, the link failure indication information includes at least one of the following: an identifier of a DU with a link failure, and channel measurement report information. Alternatively or additionally, the link activation request includes at least one of the following: an identifier of a first end of a link requested to be activated, and an identifier of a second end of the link requested to be activated.

In some implementations of the present embodiment, the operation of receiving, by the DU, the control message sent by the terminal includes: receiving, by the DU, a link activation request or link failure indication information sent by the terminal. Subsequently, the message may be forwarded to the entity part of the IAB donor through the F1AP.

In some implementations of the present embodiment, after the DU receives the control message sent by the terminal, the DU packs the link failure indication information into the RRC container, and forwards the RRC container to the entity part of the IAB donor through the F1AP.

According to another embodiment of the present disclosure, an information transmission apparatus is provided, including:

a fifth transmission module, configured to transmit a UE context request to a DU; and a fifth receiving module, configured to receive a UE context response message sent by the DU. The UE context request includes at least one of the following information: frequency point information, and resource configuration information. The UE context request includes a UE Context Setup Request or a UE context modification request. The UE context response includes a UE context setup response or a UE context modification response.

By means of the solution, an entity part of an IAB donor and a DU perform information transmission in time to determine UE context information, thereby ensuring the appropriate connection of a link used by a UE, and avoiding a long interruption delay.

It is to be noted that each of the above modules may be implemented by software or hardware. For the latter, the modules may be implemented by, but not limited to, either of the following manners: the above modules are all located in the same processor; or, the above modules are located in different processors in any combination form respectively.

Embodiment 3

An embodiment of the present disclosure provides a storage medium. In some implementations of the present embodiment, the storage medium may be configured to store program codes for executing the following operations:

In operation S1, an entity part of an IAB donor transmits information to a DU;

In operation S2, the information is used for instructing the DU to perform link status switching.

In some implementations of the present embodiment, the storage medium may include: a Universal Serial Bus Flash Disk (USB disk), a Read-Only Memory (ROM), a Random Access Memory (RAM), a mobile hard disk, a magnetic disk, or an optical disk, and any other medium that can store program codes.

An embodiment of the present disclosure provides an electronic apparatus, including a memory and a processor. The memory stores a computer program, and the processor is configured to run the computer program so as to execute the operations in any one of the method embodiments.

In some implementations of the present embodiment, the electronic apparatus may further include a transmitting device and an input/output device. The transmitting device is connected to the processor, and the input/output device is connected to the processor.

In some implementations of the present embodiment, the processor may be arranged to execute the following operations by means of a computer program:

In operation S1, an entity part of an IAB donor transmits information to a DU; and In operation S2, the information is used for instructing the DU to perform link status switching.

For specific examples in this embodiment, reference may be made to the examples described in the foregoing embodiments and exemplary implementations, and details are not repeatedly described herein in this embodiment.

It is apparent that a person skilled in the art shall understand that all of the above-mentioned modules or operations in the present disclosure may be implemented by using a general computation apparatus, may be centralized on a single computation apparatus or may be distributed on a network composed of multiple computation apparatuses. Optionally, they may be implemented by using executable program codes of the computation apparatuses. Thus, they may be stored in a storage apparatus and executed by the computation apparatuses, the shown or described operations may be executed in a sequence different from this sequence under certain conditions, or they are manufactured into each integrated circuit module respectively, or multiple modules or operations therein are manufactured into a single integrated circuit module. Thus, the embodiments of the present disclosure are not limited to any specific hardware and software combination.

What is claimed is:

1. An information transmission method, comprising:
   transmitting information to a Distributed Unit (DU) by an entity part of an Integrated Access Backhaul (IAB) donor, wherein the information is used for instructing the DU to switch a link between the DU and a terminal;
   sending, by the IAB donor, resource configuration information to the DU, wherein the DU is configured to then forward the resource configuration information to a User Equipment (UE), so that the UE simultaneously communicates with a plurality of serving DUs respectively on different resource pools.

2. The method according to claim 1, wherein the information is first information comprising at least one of:
   a cell group identifier requested to be activated;
   a cell frequency point indication requested to be activated;

a path identifier requested to be activated, wherein the path identifier comprises an uplink General Packet Radio Service Tunnelling Protocol (GTP) tunnel identifier or a UE F1 Application Protocol (F1AP) identifier or a next generation NodeB (gNB)-DU identifier;
a signaling bearer identifier requested to be activated;
a data bearer identifier requested to be activated;
a split bearer identifier requested to be activated;
a resource configuration information list; and
a reconfiguration message (RRCConnectionReconfiguration),
wherein the resource configuration information list comprises resource configuration information of a plurality of DU nodes, and the resource configuration information comprises at least one of the following: a time resource indication, a frequency domain resource indication, a frequency point indication, a beam direction or index indication, and a Bandwidth Part (BWP) indication.

3. The method according to claim 2, wherein the RRC-ConnectionReconfiguration comprises at least one of the following:
an activated cell group identifier;
an activated cell frequency point indication;
an activated path identifier, wherein the path identifier comprises an uplink GTP tunnel identifier, a UE F1AP identifier or a gNB-DU identifier;
an activated signaling bearer identifier;
an activated data bearer identifier; and
an activated split bearer identifier;
the resource configuration information list comprises resource configuration information of a plurality of DU nodes, wherein the resource configuration information comprises at least one of the following: a time resource indication, a frequency domain resource indication, a frequency point indication, a beam direction or index indication, and a BWP indication.

4. The method according to claim 1, wherein the information is carried in a terminal context modification request message.

5. The method according to claim 1, wherein the information is second information comprising at least one of:
a deactivated cell group identifier;
a deactivated cell frequency point indication;
a deactivated path identifier, wherein the path identifier comprises an uplink General Packet Radio Service Tunnelling Protocol (GTP) tunnel identifier, a User Equipment (UE) F1 Application Protocol (F1AP) identifier, or a next generation NodeB (gNB)-DU identifier;
a deactivated signaling bearer identifier;
a deactivated data bearer identifier;
a deactivated split bearer identifier; and
a reconfiguration message (RRCConnectionReconfiguration).

6. The method according to claim 5, wherein the RRC-ConnectionReconfiguration comprises at least one of the following:
a deactivated cell group identifier;
a deactivated cell frequency point indication;
a deactivated path identifier, wherein the path identifier comprises an uplink GTP tunnel identifier, a UE F1AP identifier or a gNB-DU identifier;
a deactivated signaling bearer identifier;
a deactivated data bearer identifier; and
a deactivated split bearer identifier.

7. The method according to claim 2, wherein the RRC-ConnectionReconfiguration is forwarded to a terminal by the DU.

8. An information transmission method, comprising:
receiving, by a Distributed Unit (DU), information transmitted by an entity part of an Integrated Access Backhaul (IAB) donor, wherein the information is used for instructing the DU to switch a link between the DU and a terminal; and
transmitting, by the DU, User Equipment (UE) context response information to the entity part of the IAB donor;
receiving, by the DU, resource configuration information sent by the IAB donor, and then forwarding, by the DU, the resource configuration information to a UE, so that the UE simultaneously communicates with a plurality of serving DUs respectively on different resource pools.

9. The method according to claim 8, wherein the UE context response information comprises at least one of:
an activated signaling bearer identifier;
an activated data bearer identifier;
an activated split bearer identifier;
an activated cell group identifier;
an activated cell frequency point indication;
an activated path identifier, wherein the path identifier comprises an uplink General Packet Radio Service Tunnelling Protocol (GTP) tunnel identifier, a User Equipment (UE) F1 Application Protocol (F1AP) identifier, or a next generation NodeB (gNB)-DU identifier.

10. The method according to claim 1, comprising:
transmitting, by the entity part of the IAB donor, a UE context request to the DU; and
receiving, by the entity part of the IAB donor, a UE context response message sent by the DU,
wherein the UE context request comprises at least one of the following: frequency information, and resource configuration information;
the UE context request comprises a UE context setup request or a UE context modification request; and the UE context response message comprises a UE context setup response or a UE context modification response.

11. An information transmission apparatus, comprising: a memory storing instructions and a processor in communication with the memory, wherein the processor, is configured to executing the instruction to perform the method according to claim 1.

12. An information transmission apparatus, comprising: a memory storing instructions and a processor in communication with the memory, wherein the processor, is configured to executing the instruction to perform the method according to claim 8.

13. A non-transitory computer-readable storage medium, wherein the storage medium stores a computer program, and the computer program, when being executed by a processor, is configured to cause the processor to:
transmit information to a Distributed Unit (DU) by an entity part of an Integrated Access Backhaul (IAB) donor, wherein the information is used for instructing the DU to switch a link between the DU and a terminal;
send, by the IAB donor, resource configuration information to the DU, wherein the DU is configured to then forward the resource configuration information to a User Equipment (UE), so that the UE simultaneously communicates with a plurality of serving DUs respectively on different resource pools.

14. The method according to claim 5, wherein the RRC-ConnectionReconfiguration is forwarded to a terminal by the DU.

15. The method according to claim 8, wherein before receiving, by the DU, information transmitted by the entity part of the IAB donor, the method comprises:
   determining, by the DU, link status information about a status of the link between the DU and the terminal; and
   transmitting, by the DU, the link status information to the entity part of the IAB donor.

16. The method according to claim 15, wherein transmitting the link status information to the entity part of the IAB donor comprises:
   in a case of determining that the status of the link is link recovery, transmitting link recovery indication information to the entity part of the IAB donor, wherein the link recovery indication information comprises at least one of the following: a link recovery indication, a link measurement status report, a link identifier, a DU identifier, and a current load report;
   or,
   in a case of determining that the status of the link is link failure or link blocking, transmitting link failure or link blocking information to the entity part of the IAB donor, wherein the link failure or link blocking information comprises at least one of the following: a link failure indication; a link blocking indication; a channel status report; a link identifier; a DU identifier; a current load report; and a link failure cause indication;
   wherein a link failure cause indicated in the link failure cause indication comprises one of the following: a poor link status, or a link blocking caused by link congestion.

17. The method according to claim 8, wherein the method comprise:
   determining, by the DU, that the link between the DU and the terminal is not activated, and allocating, by the DU, a resource to the terminal; and
   receiving, by the DU, a control message sent by the terminal.

18. The method according to claim 17, wherein allocating, by the DU, the resource to the terminal comprises one of:
   allocating Scheduling Request (SR) information to the terminal, wherein the SR information is used for the terminal to report a link activation request or for the terminal to report a resource request; and
   allocating a Semi-Persistent Scheduling (SPS) resource to the terminal, wherein the SPS resource is used for the terminal to report link failure indication information;
   or,
   receiving, by the DU, the control message sent by the terminal comprises:
   receiving, by the DU, a link activation request or link failure indication information sent by the terminal.

19. The method according to claim 18, further comprising at least one of:
   the link failure indication information comprises at least one of the following: an identifier of a DU with a link failure, and channel measurement report information;
   the link activation request comprises at least one of the following: an identifier of a first end of a link requested to be activated, and an identifier of a second end of the link requested to be activated.

20. The method according to claim 18, wherein after receiving, by the DU, the control message sent by the terminal, the method further comprises:
   packing, by the DU, the link failure indication information into a Radio Resource Control (RRC) container, and forwarding, by the DU, the RRC container to the entity part of the IAB donor via an F1 Application Protocol (F1AP).

* * * * *